US012368287B2

(12) United States Patent
Peters

(10) Patent No.: US 12,368,287 B2
(45) Date of Patent: Jul. 22, 2025

(54) ADAPTATION MODULE FOR A GAS-INSULATED SWITCHGEAR

(71) Applicant: Hitachi Energy Ltd, Zürich (CH)

(72) Inventor: Hauke Peters, Hanau (DE)

(73) Assignee: HITACHI ENERGY LTD, Zurich (CH)

( * ) Notice: Subject to any disclaimer, the term of this patent is extended or adjusted under 35 U.S.C. 154(b) by 172 days.

(21) Appl. No.: 18/103,677

(22) Filed: Jan. 31, 2023

(65) Prior Publication Data

US 2023/0246426 A1   Aug. 3, 2023

(30) Foreign Application Priority Data

Feb. 2, 2022 (EP) ..................................... 22154809

(51) Int. Cl.
*H02B 13/035* (2006.01)
*H02B 13/045* (2006.01)

(52) U.S. Cl.
CPC ..... *H02B 13/0352* (2013.01); *H02B 13/0358* (2013.01); *H02B 13/045* (2013.01)

(58) Field of Classification Search
CPC ............ H02B 13/0352; H02B 13/0358; H02B 13/045; H02G 5/063; H02G 5/068
See application file for complete search history.

(56) References Cited

U.S. PATENT DOCUMENTS

| 2008/0073188 A1* | 3/2008 | Emura | ...................... H01H 9/22 200/50.12 |
| 2010/0172069 A1* | 7/2010 | Betz | ......................... H02B 5/06 361/612 |
| 2010/0236905 A1* | 9/2010 | Capelli | ................ H02B 11/127 200/50.24 |
| 2012/0006665 A1* | 1/2012 | Sologuren-Sanchez | ..................... H02G 5/002 200/5 A |
| 2012/0138575 A1* | 6/2012 | Saxl | ....................... H01H 33/56 218/156 |

(Continued)

FOREIGN PATENT DOCUMENTS

| CN | 111129890 A |   | 5/2020 |   |
| DE | 3313192 A1 | * | 4/1983 | ............. H02B 11/26 |

(Continued)

OTHER PUBLICATIONS

Examination Report for Indian Patent Application No. 202344005779, mailed May 13, 2024, 6 pages.

(Continued)

*Primary Examiner* — Timothy J Thompson
*Assistant Examiner* — Rhadames Alonzo Miller
(74) *Attorney, Agent, or Firm* — Sage Patent Group

(57) ABSTRACT

The disclosure relates to an adaptation module configured for connecting three conductors of two modules and/or bays of a three-phase encapsulated gas-insulated switchgear, including two opposite arranged insulators each including three radially spaced conductor connection inlets and configured for electrically connecting the conductor connection inlets to one of the two modules and/or bays, and three concentrically arranged axially extending conductors each connected to two opposite conductor connection inlets, spaced from each other and rotatable in respect to the axis.

20 Claims, 6 Drawing Sheets

(56) References Cited

U.S. PATENT DOCUMENTS

| | | | | |
|---|---|---|---|---|
| 2012/0181156 | A1* | 7/2012 | Betz | H01H 31/003 200/48 R |
| 2013/0148268 | A1* | 6/2013 | Sologuren-Sanchez | H02B 5/06 361/612 |
| 2013/0167675 | A1* | 7/2013 | Kim | H01H 31/003 74/89.17 |
| 2013/0279084 | A1* | 10/2013 | Harada | H02B 5/06 361/618 |
| 2013/0292358 | A1* | 11/2013 | Hu | H01H 33/42 218/5 |
| 2015/0236485 | A1* | 8/2015 | Hashimoto | H02B 5/06 361/618 |
| 2016/0086744 | A1* | 3/2016 | Tasaka | H01H 9/02 200/293 |
| 2016/0126028 | A1* | 5/2016 | Mun | H02B 11/133 200/50.12 |
| 2020/0126742 | A1* | 4/2020 | Ranjan | H01H 33/7038 |
| 2020/0280178 | A1* | 9/2020 | Barenthin | H02B 5/06 |
| 2021/0057177 | A1* | 2/2021 | Tanigaki | H02B 13/035 |
| 2021/0175691 | A1* | 6/2021 | Yoshida | H02B 13/0352 |
| 2021/0288477 | A1* | 9/2021 | Fujioka | H02B 13/035 |

FOREIGN PATENT DOCUMENTS

| | | |
|---|---|---|
| JP | H02129105 U | 10/1990 |
| JP | H07163036 A | 6/1995 |
| JP | H0739210 U | 7/1995 |
| WO | WO-2015150181 A1 * 10/2015 | H02B 13/0352 |

OTHER PUBLICATIONS

Notice of Grant for Japanese Patent Application No. 2023-013951, mailed Jul. 2, 2024, 3 pages.

Extended European Search Report, European Application No. 22154809.2, mailed Jul. 18, 2022, 10 pages.

* cited by examiner

ADAPTATION MODULE FOR A GAS-INSULATED SWITCHGEAR

CROSS REFERENCE TO RELATED APPLICATIONS

This application claims priority to European Patent Application Number 22154809.2, filed on Feb. 2, 2022, the disclosure and content of which is incorporated by reference herein in its entirety.

TECHNICAL FIELD

The disclosure relates to an adaptation module configured for connecting three conductors of two modules and/or bays of a three-phase encapsulated gas-insulated switchgear.

BACKGROUND

In an electric power system, switchgear is composed of electrical disconnect switches, fuses or circuit breakers used to control, protect and isolate electrical equipment. Switchgear is used both to de-energize equipment to allow work to be done and to clear faults downstream. Gas-insulated switchgear, GIS, is a form of switchgear where conductors and contacts are insulated by pressurized gas, mainly sulfur hexafluoride gas, SF6. For environmental reason alternative insulation gases are under development to replace SF6.

Switchgear in substations is typically located on both the high- and low-voltage sides of large power transformers. Such switchgear usually comprises different modules and/or bays, for example circuit breakers, disconnector and earthing switches, gas-insulated voltage transformers, cast-resin current transformers, air- or gas-insulated surge arresters or the like.

In such substation incoming and outgoing lines or cables may have different phase orientations, which makes it desirable to adapt a conductor connection in a three-phase encapsulated GIS between the modules or bays by angle rotation or complete phase cross-over change by means of turning modules or cross-over conductors. As different layouts may employ different variants of this rotation angle, several modules with different phase shift and cross-over conductors may be employed to achieve the correct phase orientation through the whole GIS. Thus, a high number of variants exist, which different busduct and angle piece configurations, such as T- or X-modules with a different number of conductor sets. Today, for an angle piece a number of 36 variants exists. Additionally, there are further variants in the circuit breaker, and busducts. Such high number of variants lead to higher engineering efforts, storage and production costs. Further, if during engineering a wrong rotation was planned, new material may be necessary to correct the failure.

SUMMARY

It is therefore an object of the disclosure to provide an improved possibility for adapting the connection between the modules and/or bays of a three-phase encapsulated gas-insulated switchgear, GIS.

An object of the disclosure is solved by the features of the independent claims. Implementations are detailed in the dependent claims.

Thus, an object is solved by an adaptation module configured for connecting three conductors of two modules and/or bays of a three-phase encapsulated gas-insulated switchgear, comprising two opposite arranged insulators each comprising three radially spaced conductor connection inlets and configured for electrically connecting the conductor connection inlets to one of the two modules and/or bays, and three concentrically arranged axially extending conductors each connected to two opposite conductor connection inlets, spaced from each other and rotatable in respect to the axis.

A proposed solution takes advantage from concentric conductors, which may be in the middle of the module and which may include a set of three different connection pieces to the insulators. Such solution makes it possible to provide all possible phase angle shifts or phase cross-over or a combination of both within one module. The conductor connection inlets at the insulators can be shifted and placed in any angle. The layout can be adjusted during assembly. In case of wrong planning the same parts can be used to achieve the correct layout. Thus, the proposed solution leads to lower engineering efforts, storage and production costs.

The adaptation module can be configured for firmly fixing between two modules and/or bays for example by means of screws, whereby said screws can be arranged in a ring-like manner around the conductor connection inlets on the insulators. The modules and/or bays can be provided as, for example, circuit breakers, disconnector and earthing switches, gas-insulated voltage transformers, cast-resin current transformers, air- or gas-insulated surge arresters or the like of the gas-insulated switchgear. The insulators may comprise a disc-like and/or round flat form to which the conductor connection inlets are attached.

The conductor connection inlets may be provided as electrodes for electrically contacting respective electrodes of the modules and/or bays. The conductor connection inlets may be radially spaced in respect to the axis in regular distances. Spaced from each other in respect to the conductors means that the conductors are arranged distant from each other without electrically contacting an adjacent conductor. Rotatable in respect to the axis means that the conductors can be rotated in respect to their axis such that, by rotating, the respective opposite arranged conductor connection inlets can be rotated into different angular positions in respect to each other.

According to an implementation at least one of the conductors comprises two opposite arranged radially extending connection pieces connecting the respective conductor to both respective conductor connection inlets. All conductors may comprise respective connection pieces. The connection pieces may provide a radial and/or axial offset between the connectors and the insulators. Thus, the connection pieces can be understood as a radial and/or axial extension of the connectors for providing an electrical connection to arts the conductor connection inlets. The connection pieces can be provided as busbars or metal rods. The two opposite connection pieces connected to a respective conductor can be differently orientated, for example one connection piece can be radially orientated upwards in respect to the axis while the other connection piece is radially orientated downwards in respect to the axis. Opposite arranged means that in axial extension the respective conductor is arranged in-between the two respective connection pieces.

In a further implementation the connection pieces are attached rotatable to the respective conductor. The connection pieces may be undetachable but rotatable attached to the conductor, for example by clipping. An axial end of the conductor and/or an axial end of the connection piece may be provided with an in particular circumferential groove extending in radial direction, to which the connection piece and/or the conductor is connected, for example by means of a sliding contact.

In another implementation the respective connection piece is provided one-piece with the respective conductor or at least a part thereof. This means that the connection piece can for example be manufactured as one-piece together with the respective conductor or at least a part thereof. According to a further implementation the one-piece is provided as a casted element. Thus, the respective conductor and the connection piece can be manufactured by pouring a liquid material into a respective mold, which contains a hollow cavity of the desired shape of the respective conductor and the connection piece.

In another implementation at least two of the conductors surround radially at least one other of the conductors. For example, the outmost conductor radially surrounds both the middle and innermost conductor, while the middle conductor also radially surrounds the innermost conductor.

According to a further implementation at least two conductors, and as many as all conductors, may be provided as tubes. The conductors may be provided as elongated metal and thus electrically conducting tubes. While the conductors may comprise an identical axial extension, the innermost conductor may be larger in its axial extension than the middle conductor, while the middle conductor is also larger in its axial extension then the outermost conductor. The conductors may comprise at their axial ends a lateral radially extending edge or rim, to which the connection piece is attached.

In another implementation the conductors are provided two-piece and one piece is rotatable in respect the other piece. Such way rotatability of the concentrically arranged conductors can be easily achieved. The conductors may be undetachable attached to each other, for example clipped together, while being rotatable in respect to each other. Further, the two pieces may be attached in a ring-like manner together. The two pieces may each exhibit a radially extending surface, for example in form of a round, disc-shaped or square surface with a hole, that are attached together.

According to a further implementation at least one piece comprises a sliding contact configured for electrically contacting the other piece. In another implementation the other piece comprises an annular contact element and/or an annular groove configured for receiving the sliding contact. Witch such sliding contact and groove a reliable electrical connection between the two pieces can be achieved, while allowing the conductors to rotate across the axis. The sliding contact and/or the groove may extend in radial direction and/or across the complete annular extension and/or circumferential around the axis.

According to a further implementation the three conductors are rotatable by a rotation angle $\alpha \geq 0°$ and $\leq 360°$ in respect to the axis. The conductors may be rotatable by a rotation angle $\alpha \geq 0°$ and $\leq 180°$, $\alpha \geq 0°$ and $\leq 90°$ or $\alpha \geq 0°$ and $\leq 45°$ in respect to the axis. In another implementation the conductors axially extend over at least over 0.1, 0.2, 0.5, 1, 2 or 5 meters. Such way a tube connection can be realized. Due to a mainly concentric arrangement of the conductors forces during an eventually short circuit will compensate each other.

According to a further implementation the conductors are bent along their axis with a bending angle $\beta \geq 0°$ and $\leq 180°$. Thus, instead of straight concentric conductors, the conductors may comprise an angle of for example 45° or 90°, while still concentric.

In another implementation the three conductor connection inlets are radially spaced as equilateral triangle. The conductor connection inlets may be arranges in regular distances around the axis, thereby providing a kind of interface with locally defined electrodes for electrically connecting the adaptation module to a module and/or bay.

An object of the disclosure is further solved by a gas-insulated switchgear comprising at least two modules and/or bays and an adaption module according to any of the previous claims, whereby the adaptation module connects the three conductors of two modules and/or bays.

The gas-insulated switchgear may be configured for high voltages. The term high voltage relates to voltages that exceeds 1 kV. A high voltage may concern nominal voltages in the range from above 72 kV to 800 kV, like 145 kV, 245 kV or 420 kV. The gas insulated switchgear may be provided as a circuit breaker and/or may include one or more components such as, a puffer-type cylinder, a self-blast chamber, a pressure collecting space, a compression space, or puffer volume, and an expansion space. The gas insulated switchgear may effectuate interruption of contact elements by means of one or more of such components, thereby discontinuing flow of electrical current in the contact elements, and/or extinction of the arc produced when the contact elements is interrupted.

The gas-insulated switchgear may comprise an insulating gas which can be any suitable gas that enables to adequately extinguish an electric arc formed between the contact elements during a current interruption operation, such as, but not limited, to an inert gas as, for example, sulphur hexafluoride SF6. Specifically, the insulating gas used can be SF6 gas or any other dielectric insulation medium, may it be gaseous and/or liquid, and in particular can be a dielectric insulation gas or arc quenching gas.

BRIEF DESCRIPTION OF DRAWINGS

These and other aspects of the disclosure will be apparent from and elucidated with reference to the implementations described hereinafter.

In the drawings.

DESCRIPTION OF IMPLEMENTATIONS

Figure 1:
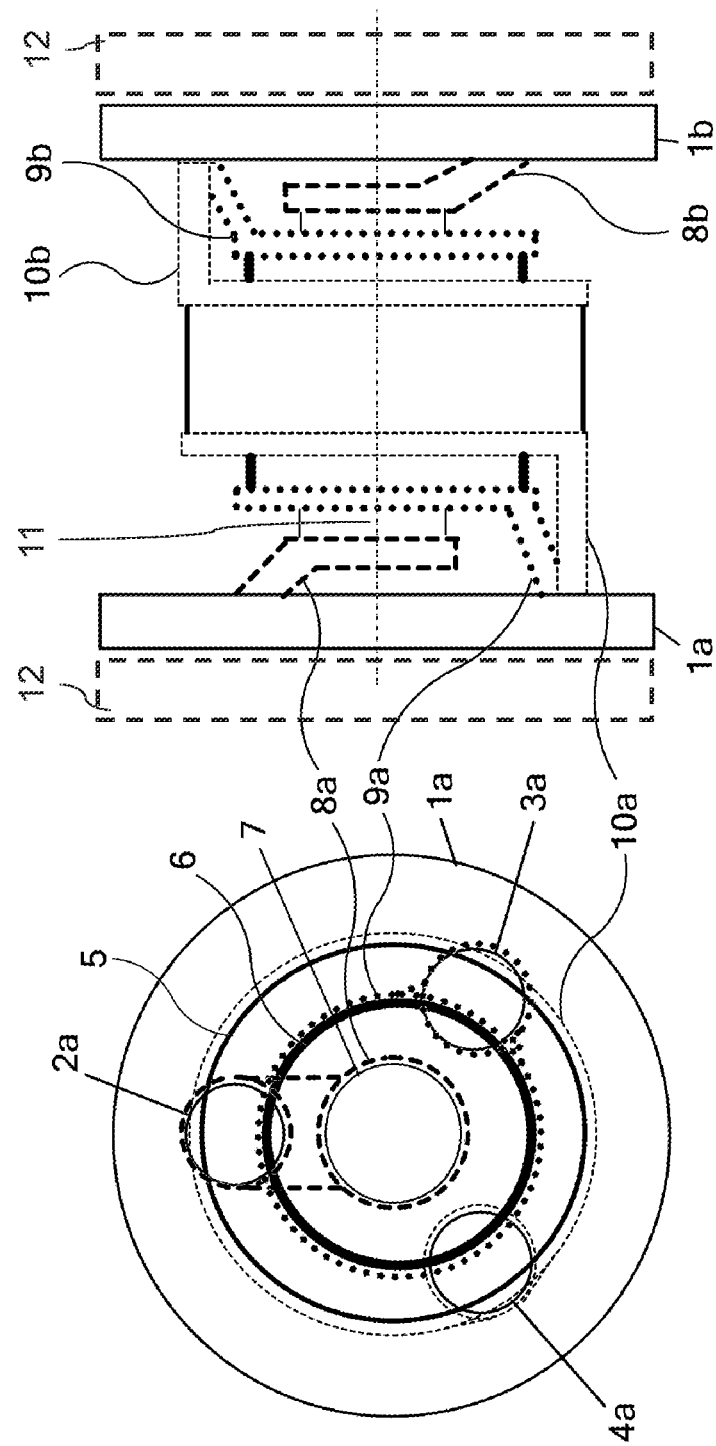
FIG. 1 shows an adaptation module configured for connecting three conductors of two modules and/or bays of a three-phase encapsulated gas-insulated switchgear, left in a front view and right in a side view, according to an implementation.
Figure 2:
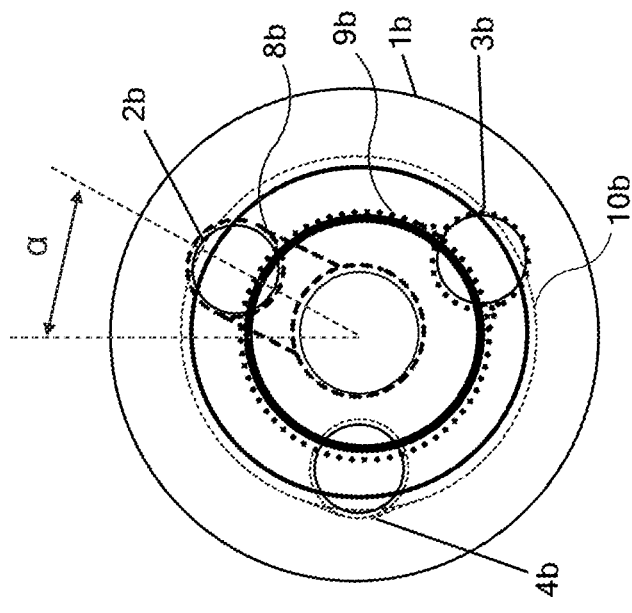
FIG. 2 shows the adaptation module of FIG. 1, left in the front view and right in a back view, according to the implementation in a first configuration.
Figure 2:
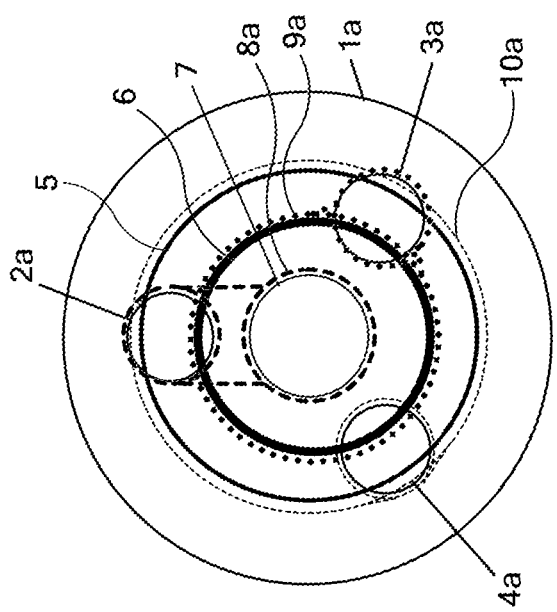
Figure 3:
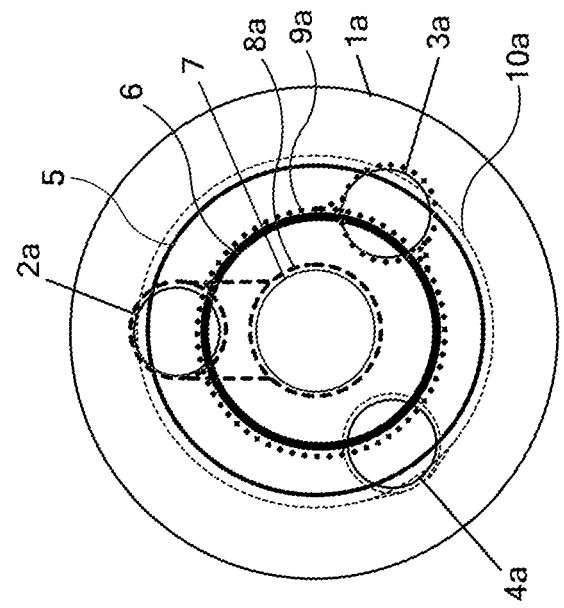
FIG. 3 shows the adaptation module of FIG. 1, left in the front view and right in the back view, according to the implementation in second first configuration.
Figure 3:
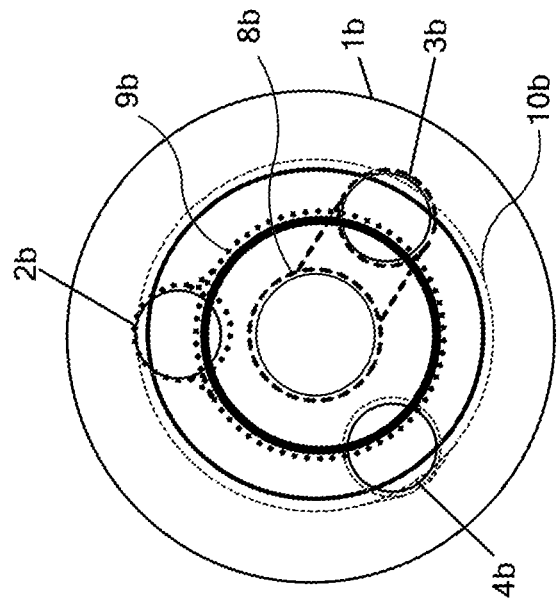
Figure 4:
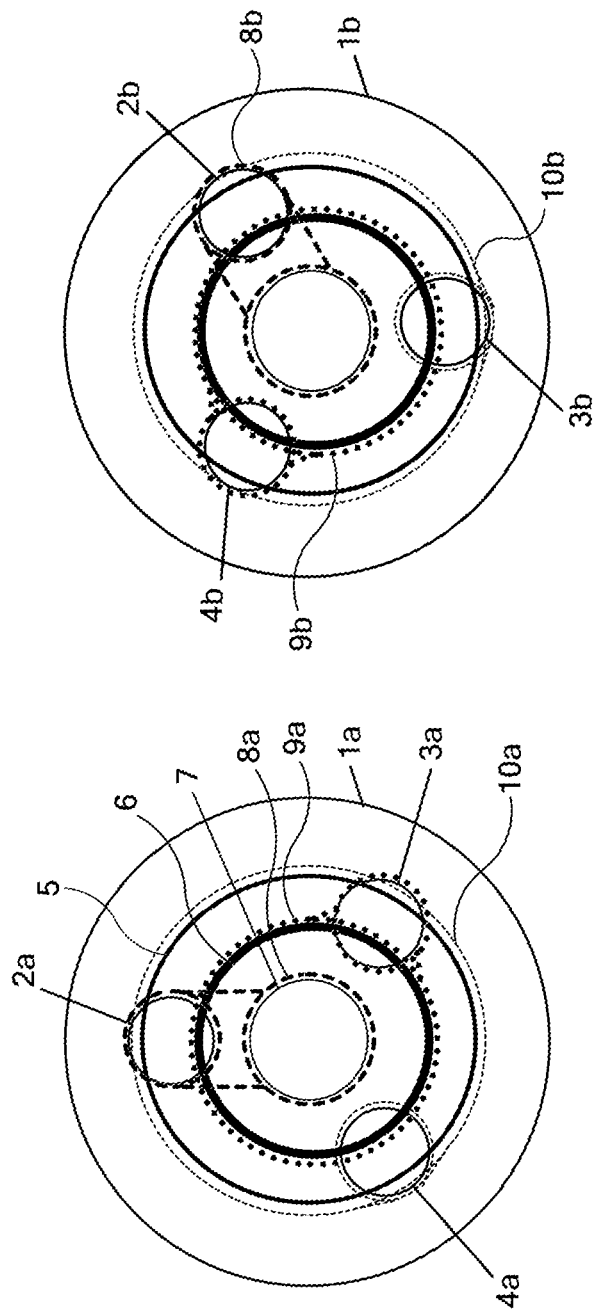
FIG. 4 shows the adaptation module of FIG. 1, left in the front view and right in the back view, according to the implementation in third first configuration.

FIG. 1 shows an adaptation module configured for connecting three conductors 5, 6, 7 of two modules and/or bays 12 of a three-phase encapsulated gas-insulated switchgear, left in a front view and right in a side view, according to an implementation. FIGS. 2 to 4 show the adaptation module of FIG. 1 left in the front view and right in a back view according to three different configurations.

The adaptation module comprises two opposite arranged insulators 1a, 1b, which are each provided as disc-like rounded slices or flat rings. By means of said insulators 1a, 1b the adaptation module can be connected on each side to a module and/or bay 12, only schematically shown with dotted lines, of a three-phase encapsulated gas-insulated switchgear, GIS. Thus, such module and/or bay 12 may comprise, for example, a circuit breaker, a disconnector and earthing switch, a gas-insulated voltage transformer, a cast-resin current transformer, an air- or gas-insulated surge arrester or the like. The insulators 1a, 1b are firmly fixed to the respect module and/or bay 12 by means of 12 or 24 screws, not shown, which can be arranged in regular intervals.

The three conductors 5, 6, 7 are provided as axially extending tubes having different radial diameters and are arranged in regular distances around a concentric manner around axis 11 of the adaptation module thereby radially surround each other. As can be seen from FIG. 1 right, outmost conductor 5 comprises the largest diameter and the smallest axial extension, while innermost conductor 7 comprises the smallest diameter and the biggest axial extension. Inner conductor 6 comprises a smaller diameter than the outmost conductor 5 and a larger diameter than the innermost conductor 7, and comprises a larger axial extension than the outmost conductor 5 and a smaller axial extension than the innermost conductor 7. Further, inner conductor 6 is radially arranged between outmost conductor 5 and innermost conductor 7 such that all conductors 5, 6, 7 are arranged spaced from each.

Each insulator 1a, 1b comprises three conductor connection inlets 2, 3, 4, which are radially spaced in forming an equilateral triangle, as can be in FIG. 1 left. The connection inlets 2, 3, 4 are provided as flat electrodes and are integrated in the insulators 1a, 1b. Each one of the conductors 5, 6, 7 is connected to a respective connection inlet 2, 3, 4 of both insulators 1a, 1b by means of a radially extending connection piece 8a, 8b, 9a, 9b, 10a, 10b.

Said extending connection pieces 8a, 8b, 9a, 9b, 10a, 10b form a radial offset between the respective conductor 5, 6, 7 and the respective connection inlet 2, 3, 4. For example, by referring to FIG. 1 right, innermost conductor 7 is on the left side connected by an upward oriented connection piece 8a to the respective connection inlet 2 on the left insulator 1a and is on the right side connected by a downward oriented connection piece 8b to the respective connection inlet 2 of the right insulator 1b.

The conductors 5, 6, 7 are provided rotatable in respect to the axis 11. This means that the conductors 5, 6, 7 can be rotated such that the angular orientation of the two opposite arranged oriented connection pieces 8a, 8b, 9a, 9b, 10a, 10b can be changed. Such way the adaptation module allows different angular orientations of the respective opposite connection inlets 2, 3, 4 in respect to each other, of which some exemplary orientations are described in the following.

FIG. 2 shows the adaptation module of FIG. 1, left in the front view and right in a back view, according to the implementation in a first configuration providing a phase shift of 30° between the insulators 1a, 1b. Specifically, right insulator 1b comprising right conductor connection inlets 2b, 3b, 4b is rotated by 30° clockwise against left insulator 1a comprising left conductor connection inlets 2a, 3a, 4a. Such wise right connection pieces 8b, 9b, 10b b follow the rotation resulting in a 30° phase shift without cross-over between the opposite connection inlets 2, 3, 4 respectively the opposite modules and/or bays 12.

FIG. 3 shows the adaptation module of FIG. 1, left in the front view and right in a back view, according to the implementation in a second configuration providing a cross-over for connection inlets 2 and 3 i.e. for the first and second connection inlet 2, 3 but not for the third connection inlet 4, and with no phase shift. Specifically, first, left connection inlet 2a of left insulator 1a is connected over first left and right connection pieces 8a and 8b with second, right connection inlet 3b of right insulator 1b. Third, left connection inlet 3a of left insulator 1a is connected over second left and right connection pieces 9a and 9b with second right connection inlet 2b of right insulator 1b. Third connection inlet 4 is connected straight from left insulator 1a to right insulator 1b without any cross-over.

FIG. 4 shows the adaptation module of FIG. 1, left in the front view and right in a back view, according to the implementation in a third configuration providing a phase shift of 60° with a cross-over second and third connection inlets 3 and 4. Specifically, all right connection inlets 2b, 3b, 4b are shifted by 60° clockwise against all left connection inlets 2a, 3a, 4a. First connection piece 8 follows first connection inlet 2. Second, right connection piece 9b is connected to right second connection inlet 4b, while second, left connection piece 9a is connected with left, first connection inlet 3a.

For achieving said rotatability of the conductors 5, 6, 7 in respect to axis 11 at least two combinable options exist. First, said conductors 5, 6,7 can be provided two-piece, whereby one piece is rotatable in respect the other piece. Therefore, the one piece comprises an annular sliding contact which slides in an annular oriented groove of the other piece thereby establishing the electrical connection between the pieces while rotating. Second, the connection pieces 8, 9, 10 can be attached rotatably to the conductors 5, 6, 7, for example also means of such circumferential groove and circumferential sliding contact.

Figure 5:
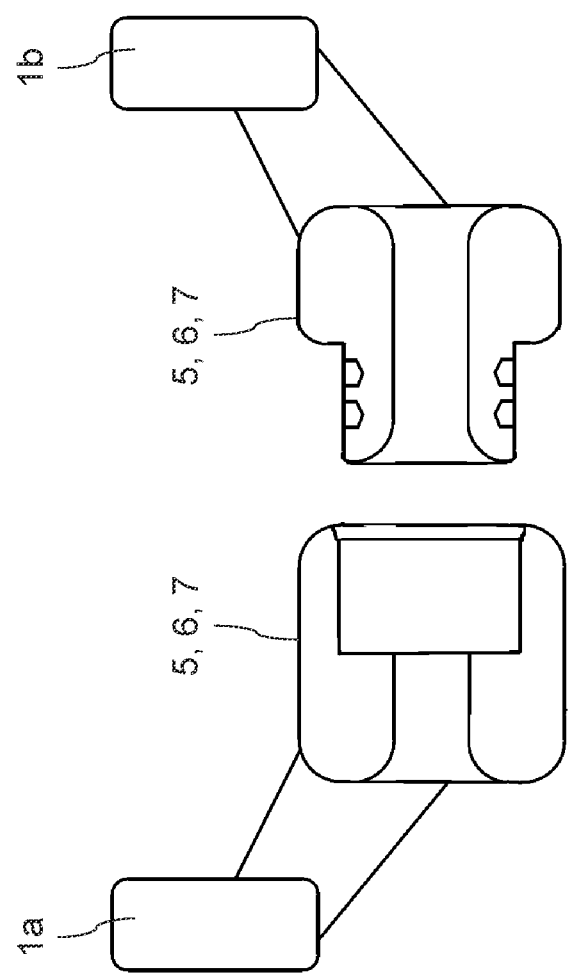
FIG. 5 shows the adaptation module of FIG. 1, in a side view, according to another implementation.

FIG. 5 shows another implementation where each one piece of the conductors 5, 6, 7 is provided one-piece with the respective connection piece 8, 9, 10 as a casted element i.e. the left piece of conductors 5, 6, 7 is provided one-piece with the respective left connection piece 8a, 9a, 10a and the right piece of conductors 5, 6, 7 is provided one-piece with the respective right connection piece 8b, 9b, 10b. With such implementation a short axial adaptation module length can be achieved, as the respective connection pieces 8, 9, 10 can be basically omitted. Also, while not shown in the FIGS., the conductors 5, 6, 7 may axially extend over at least over 0.1, 0.2, 0.5, 1, 2 or 5 meters between the insulators 1a, 1b.

Figure 6:
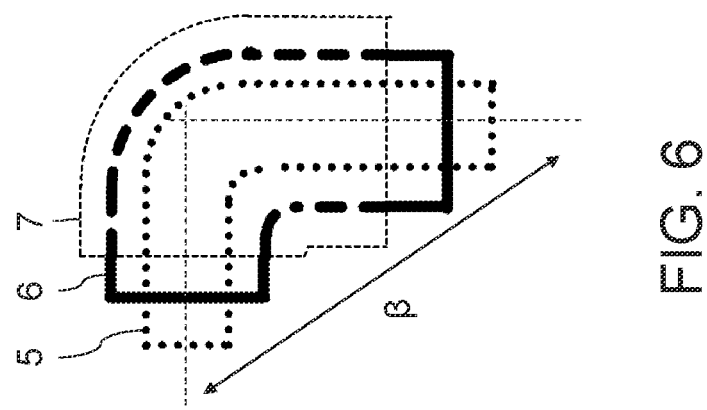
FIG. 6 shows the adaptation module of FIG. 1, in a side view, according to even another implementation.

In the implementation shown in FIGS. 1 to 5 the conductors 5, 6, 7 are rotatable by a rotation angle $\alpha \geq 0°$ and $\leq 360°$ in respect to the axis 11. FIG. 2 right showing the back view indicates angle $\alpha$ in respect to FIG. 2 left showing the front view, where angle $\alpha$ is around 20° for the shown implementation. FIG. 6 shows yet another implementation where the conductors 5, 6, 7 are bent along the axis 11 by an angle $\beta=90°$. In other not shown implementations the conductors 5, 6, 7 can be bent along their axis 11 with a bending angle $\beta \geq 0°$ and $\leq 180°$, for example 45°.

While the disclosure has been illustrated and described in detail in the drawings and foregoing description, such illustration and description are to be considered illustrative or exemplary and not restrictive; the disclosure is not limited to the disclosed implementations. Other variations to be disclosed implementations can be understood and effected by those skilled in the art in practicing the claimed disclosure, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting scope.

The invention claimed is:

1. An adaptation module configured to connect three conductors of two modules and/or bays of a three-phase encapsulated gas-insulated switchgear, the adaptation module comprising:
    two opposite arranged insulators each comprising three radially spaced conductor connection inlets and configured to electrically connect the conductor connection inlets to one of the two modules and/or bays; and
    three concentrically arranged axially extending conductors each connected to two opposite conductor connection inlets, spaced from each other and rotatable with respect to the axis.

2. The adaptation module according to claim 1, wherein at least one of the conductors comprises two opposite arranged radially extending connection pieces connecting the respective conductor to both respective conductor connection inlets.

3. The adaptation module according to claim 2, wherein the connection pieces are attached rotatable to the respective conductor.

4. The adaptation module according to claim 2, wherein the respective connection piece is provided as one piece with the respective conductor.

5. The adaptation module according to claim 4, wherein the one piece is provided as a casted element.

6. The adaptation module according to claim 1, wherein at least two of the conductors radial surround at least one other of the conductors.

7. The adaptation module according to claim 1, wherein at least two conductors are provided as tubes.

8. The adaptation module according to claim 1, wherein the conductors are provided as two pieces, and
    wherein one piece of the two pieces is rotatable in respect the other piece of the two pieces.

9. The adaptation module according to claim 8, wherein at least one piece of the two pieces comprises a sliding contact configured for electrically contacting the other piece of the two pieces.

10. The adaptation module according to claim 9, wherein the other piece of the two pieces comprises an annular contact element and/or an annular groove configured for receiving the sliding contact.

11. The adaptation module according to claim 1, wherein the three conductors are rotatable by a rotation angle $\alpha \geq 0°$ and $\leq 360°$ with respect to the axis.

12. The adaptation module according to claim 1, wherein the conductors axially extend over at least over 0.1 meters.

13. The adaptation module according to claim 1, wherein the conductors are bent along their axis with a bending angle $\beta \geq 0°$ and $\leq 180°$.

14. The adaptation module according to claim 1, wherein the three conductor connection inlets are radially spaced as an equilateral triangle.

15. The adaptation module according to claim 1, wherein all of the conductors are provided as tubes.

16. The adaptation module according to claim 1, wherein the conductors axially extend over at least over 1 meter.

17. The adaptation module according to claim 1, wherein the conductors axially extend over at least over 5 meters.

18. A gas-insulated switchgear comprising:
    at least two modules and/or bays; and
    an adaptation module comprising:
        two opposite arranged insulators each comprising three radially spaced conductor connection inlets and configured to electrically connect the conductor connection inlets to one of the two modules and/or bays; and
        three concentrically arranged axially extending conductors each connected to two opposite conductor connection inlets, spaced from each other and rotatable with respect to the axis, the adaptation module connecting the three conductors of two modules and/or bays.

19. The gas-insulated switchgear of claim 18, wherein the switchgear comprises a three-phase encapsulated gas-insulated switchgear.

20. An electric power system comprising:
    an electrical equipment;
    a three-phase encapsulated gas-insulated switchgear configured to control, protect, and isolate the electrical equipment, the switchgear comprising:
        at least two modules and/or bays; and
        an adaptation module comprising:
            two opposite arranged insulators each comprising three radially spaced conductor connection inlets and configured to electrically connect the conductor connection inlets to one of the two modules and/or bays; and
            three concentrically arranged axially extending conductors each connected to two opposite conductor connection inlets, spaced from each other and rotatable with respect to the axis, the adaptation module connecting the three conductors of two modules and/or bays.

* * * * *